United States Patent [19]
Nakajima et al.

[11] Patent Number: 6,107,221
[45] Date of Patent: Aug. 22, 2000

[54] CARD FOR CLEANING A CARD PROCESSOR

[76] Inventors: Norio Nakajima, 1-2-3 Yawata, Ichikawa-shi, Chiba-ken, Japan; Isao Moriki, 9-18-5-201, Kitami, Setagaya-ku, Tokyo-to, Japan

[21] Appl. No.: 09/222,691

[22] Filed: Dec. 29, 1998

[30] Foreign Application Priority Data

Mar. 18, 1998 [JP] Japan .................................. 10-068934

[51] Int. Cl.⁷ .................................................... B32B 27/00
[52] U.S. Cl. ........................... 442/401; 428/327; 235/488
[58] Field of Search ........................... 428/327; 235/488; 442/401

[56] References Cited

U.S. PATENT DOCUMENTS 3,922,438  11/1975  Brown et al. .............................. 428/327
5,824,611  10/1998  Fyler ....................................... 442/401

*Primary Examiner*—Harold I. Pitts
*Attorney, Agent, or Firm*—Chapman & Cutler

[57] ABSTRACT

Blockage of reading head sensors in a card processor is prevented by removing fine dust particles and dirt. This can be prevented with a rectangular cleaning card comprising a substrate, which comprises resilient paper, compound resin, or a thin metallic sheet, the substrate having flat portions at both ends of the rectangle, and a curved portion, convex on one side of the card and concave on the other, provided roughly in the center of the card; a cleaning face member, comprising unwoven cloth of extremely fine texture, pasted to the front face of the substrate, and magnetic strips, provided on the cleaning face and near the ends of the rectangle; and a rectangular cleaning card, comprising a substrate, which comprises resilient paper, compound resin, or a thin metallic sheet, the substrate having at least two curved portions, convex on one side of the card and concave on the other, and a cleaning face member, comprising unwoven cloth of extremely fine texture, pasted to the front face of the substrate.

6 Claims, 6 Drawing Sheets

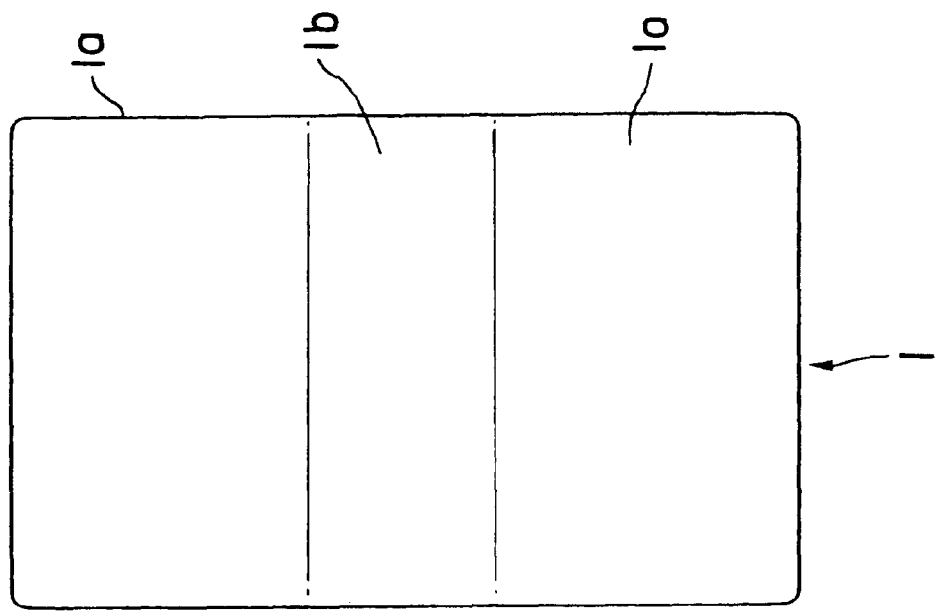
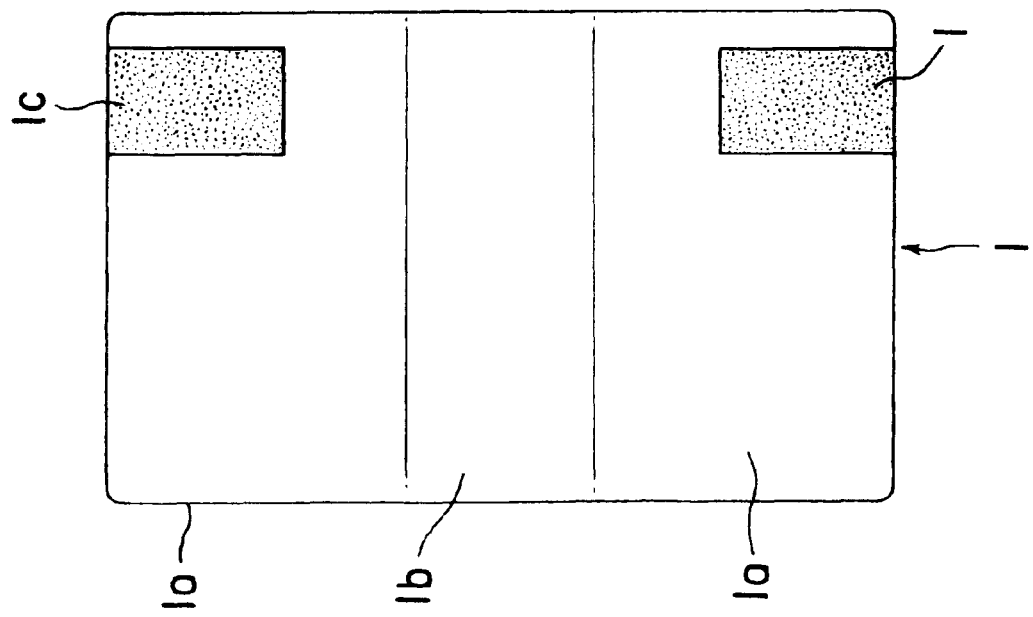
FIG. 1C
FIG. 1B
FIG. 1A

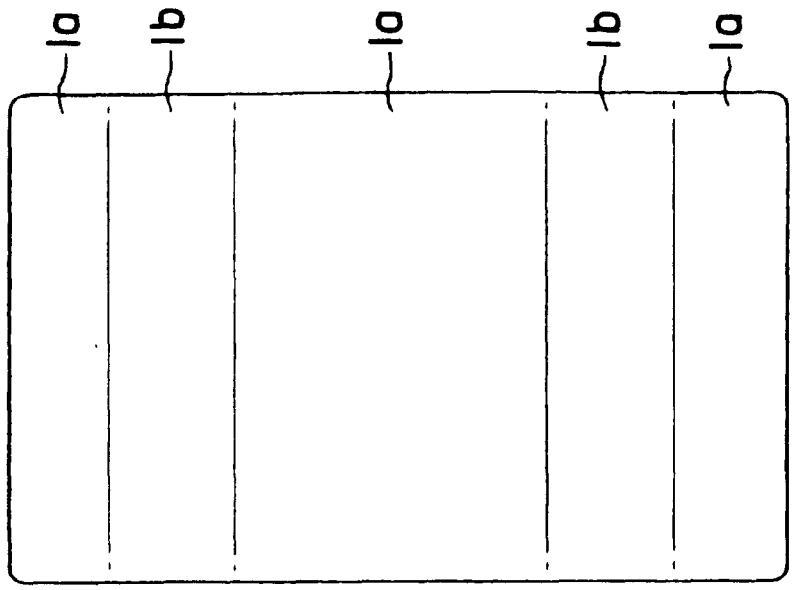
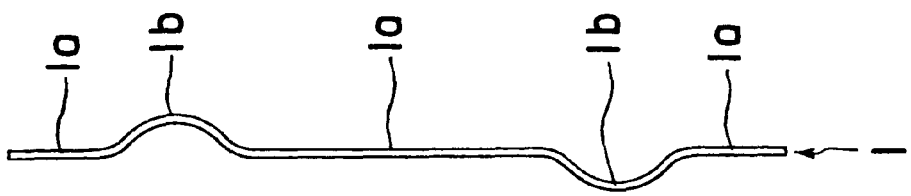
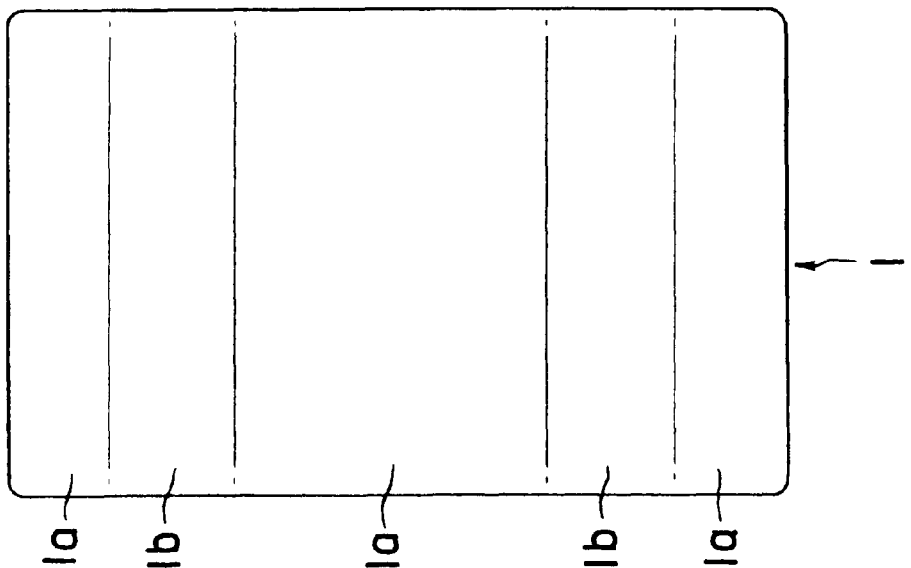

CARD FOR CLEANING A CARD PROCESSOR

BACKGROUND OF THE INVENTION

1. Field of the Invention

The present invention relates to a card for cleaning a card passageway in an automatic ticket gate at a train station, an automatic telling machine at a bank, a public pay phone, or various types of machines which read (and process) personal cards.

2. Description of the Related Art

There are two main types of card processor, one which magnetically reads information stored on a magnetic card, and another which optically reads information stored using a barcode on a barcode data card. Furthermore, the insertion direction of such a device may be one-directional or bidirectional, and some devices can read the card irrespective of whether the card is face up or face down.

An example of a device for processing a magnetic card is shown in FIG. 6 and FIG. 7. This device comprises magnetic reading heads (11, 11) which directly face rollers (12, 12), a pair of conveyor belts (13, 13), laid between the rollers (12, 12), for holding a card and conveying it, and sloping card lead-in faces (102, 102) of card insertion portion 101.

FIG. 6 and FIG. 7 represent both a magnetic system and an optical system. These systems may be one-directional or bidirectional. One system can process a card face up or face down, while another system can only process cards that have been inserted face up.

Barcode-type cards are read by optical sensors (10, 10). The width of the conveyor belts (13, 13) is narrow to allow the optical sensors (10, 10) to remain exposed. Optical sensors may also be provided directly to rotating rollers (not shown) thereby eliminating the need for conveyer belts (13, 13).

In the set-up depicted in the diagrams, dust (14) is liable to gather and accumulate in the card insertion portion (101), and especially on the sloping card lead-in faces (102, 102). Such dust can be transferred to the magnetic heads (11, 11) or the optical sensors (10, 10), where it cover the magnetic gap of the magnetic heads (11, 11) or the detection faces of the optical sensors (10, 10), thereby preventing the card from being read.

Conventionally, such card processors are cleaned by inserting a paper card or a paper card (sheet) with an unwoven cloth pasted thereto, or a card of similar structure.

However, such cleaning cards (sheets) cannot remove dust lodged within concavities in the card passageway, or dust adhering to the card lead-in faces (102, 102). Consequently, minute dust particles always remain around the reading heads 11. Once these dust particles begin to accumulate they may fall, within the magnetic gap of the reading heads (11). This leads to faulty operation, causes the reading heads 11 to become more dirty and is as source of endless problems.

SUMMARY OF THE INVENTION

The present invention has been realized in order to solve the above problems, and aims to prevent blockage of sensors in the reading heads of a card processor by removing fine dust particles and dirt.

In order to achieve the above objectives, we propose a cleaning card comprising: a substrate, which comprises resilient paper, compound resin, or a thin metallic sheet, and is a rectangle with front and rear faces, the substrate having flat portions at both ends of the rectangle in the lengthways direction, and a curved portion, convex side of the card and concave on the other, provided in a roughly central portion, a cleaning face member, comprising unwoven cloth of extremely fine texture, pasted to the front face of the substrate, and magnetic strips, provided on the cleaning face member and near ends of short sides of the rectangle; and a rectangular cleaning card for, comprising a substrate, which comprises resilient paper, compound resin, or a thin metallic sheet, the substrate having at least two curved portions, convex on one side and concave on the other, and a cleaning face member, comprising unwoven cloth of extremely fine texture, pasted to the frontface of the substrate.

BRIEF DESCRIPTION OF THE DRAWINGS

FIG. 1A, FIG. 1B and FIG. 1C are a front view, a right side view and a rear views of the first embodiment of the present invention;

FIG. 5A, FIG. 5B and FIG. 5C are a front view, a right side view and a rear view of fifth embodiment of the present invention;

DESCRIPTION OF THE PREFERRED EMBODIMENTS

Figure 2A:
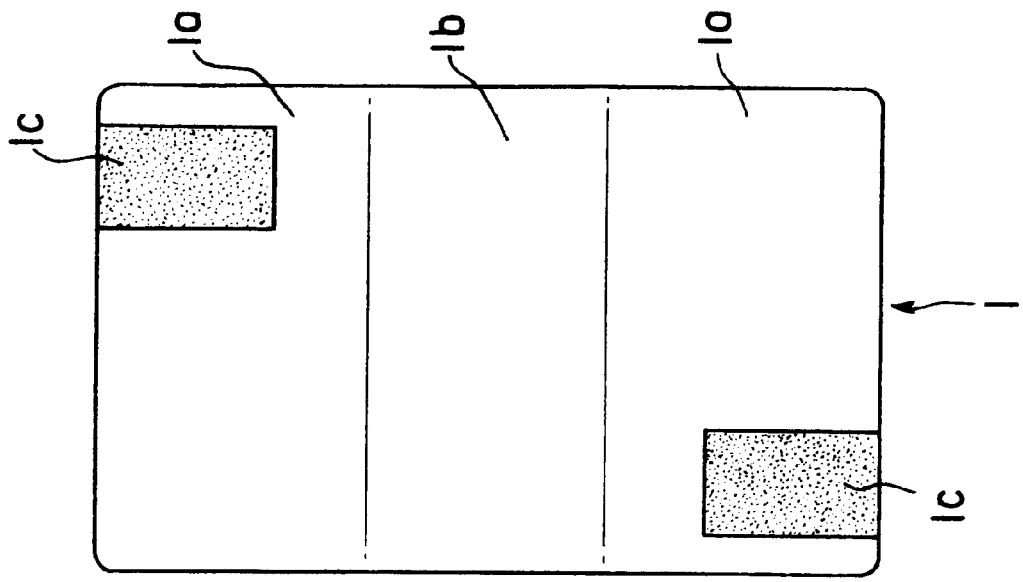
FIG. 2A, FIG. 2B and FIG. 2C are a front view, a right side view and a rear view of the second embodiment of the present invention.

FIG. 1A, FIG. 1B and FIG. 1C show a front view, a right side view and a rear view of the first embodiment of the present invention. The cleaning card (1) in FIG. 1, has roughly the same dimensions as a credit card, so as to pass through the card passageway of a card processor. This cleaning card (1) comprises a substrate of a material with sufficient resilience to sustain repeated use, for instance, paper, compound resin, or a metallic sheet, and an unwoven cloth of extremely fine texture pasted on to one side or both sides of the substrate. The extremely fine texture of the cloth has a property of trapping fine dust particles. The substrate is moulded so that both ends of the card (1) are flat portions (1a), and so that a curved portion (1b) is provided in the middle of the card or toward one end.

Furthermore, magnetic strips (1c) are pasted near the ends of the short sides of the card (1). These magnetic strips (1c) are provided to allow the card (1) to advance through the card passageway (when the card (1) is inserted into a card processor the magnetic strips function to open the card passageway). The magnetic strips (1c) can thus be much shorter than the card (1). The magnetic strips (1c) may be strips of magnetic recording tape adhered to the face of the card (1).

When the card (1) of the above construction is inserted into the insertion opening of a card processor, the card passageway opens and the card (1) is drawn into the card processor. The card (1) is then is fed along the card passageway and the curved portion brushes along wall of the card passageway. The curved portion is pushed against the dust particles which have accumulated in the concavities in front of and behind the sensors (10), and brushes them away.

Since a magnetic strip (1c) is provided at each end of the card (1), the card (1) can be inverted so that the magnetic strip (1a) aligns with the card processor detection sensor, no matter which side of the insertion opening the sensors are located on.

The card (1) may employ dry or wet cleaning methods. The above embodiment describes the dry method. In the wet method, the unwoven cloth face is impregnated with a surface-active agent or an alcoholic fluid, which helps with the removal of stubborn dirt, such as fine dust particles, ink and hand-grime.

Figure 2B:
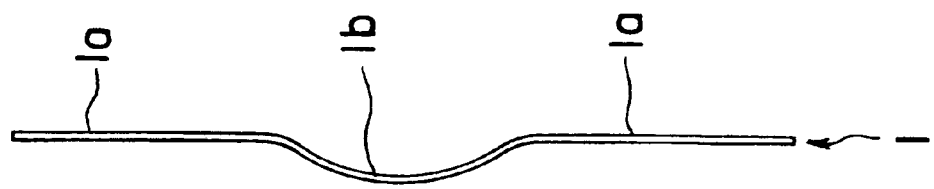
Figure 2C:
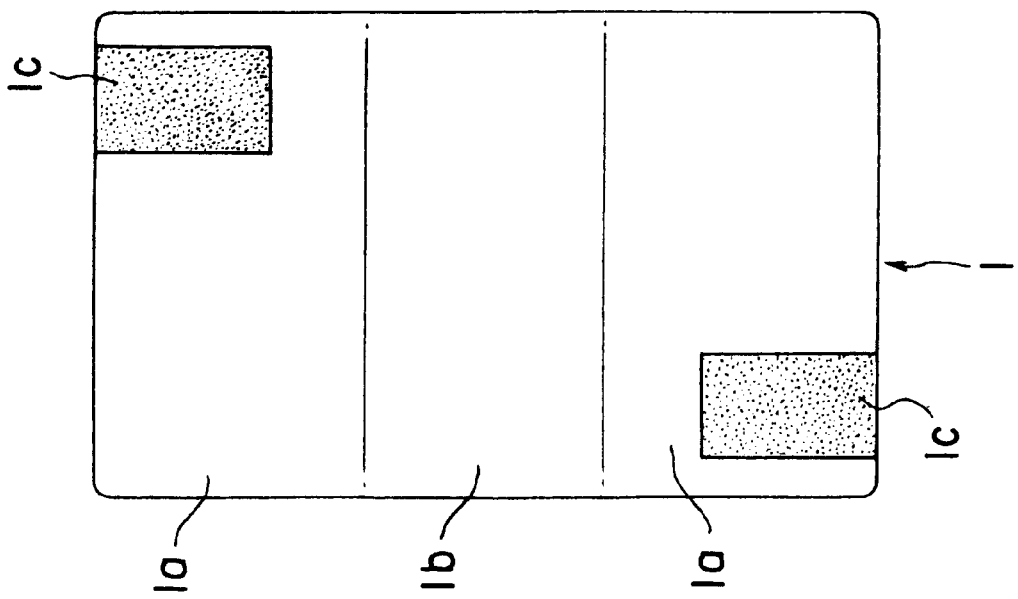

FIG. 2A, FIG. 2B and FIG. 2C are a front view, a right side view and a rear view of the second embodiment of the present invention. In the second embodiment, magnetic strips 1c are provided diagonally opposite each other on the front and back of the card (1). The aim of this construction is to enable the card (1) to be inserted not only forwards and backwards, as shown in the first embodiment of FIG. 1, but also face up and face down. In all other respects, the construction of the second embodiment is identical to the first embodiment of FIG. 1. More specifically, the magnetic strips (1c) comprise two pieces of magnetic tape of predetermined length, which are pasted to both the front and rear of the card (1).

Figure 3C:
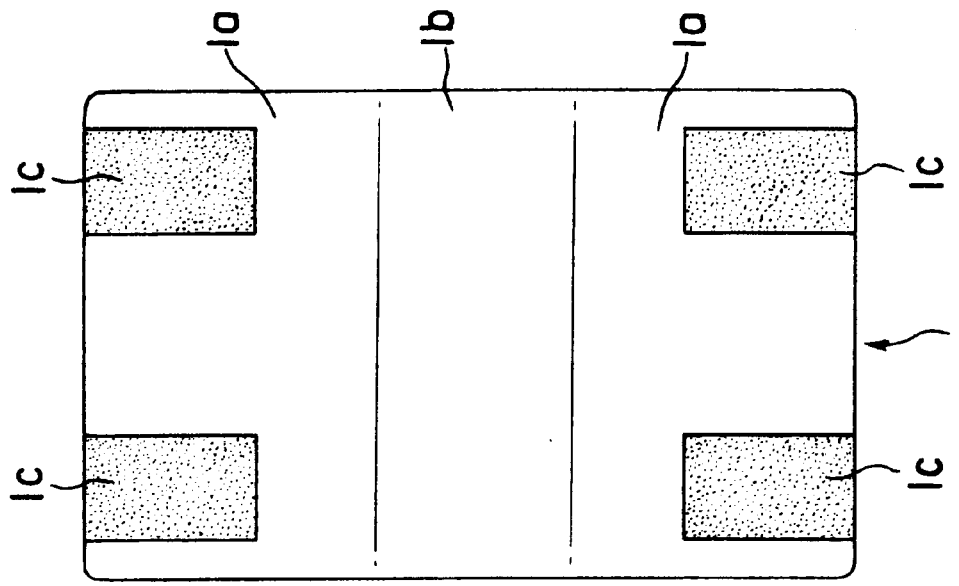
FIG. 3A, FIG. 3B and FIG. 3C are first view, a right side view and a rear view of third embodiment of the present invention.
Figure 3B:
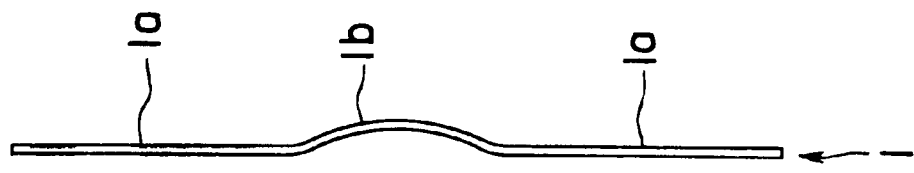
Figure 3A:
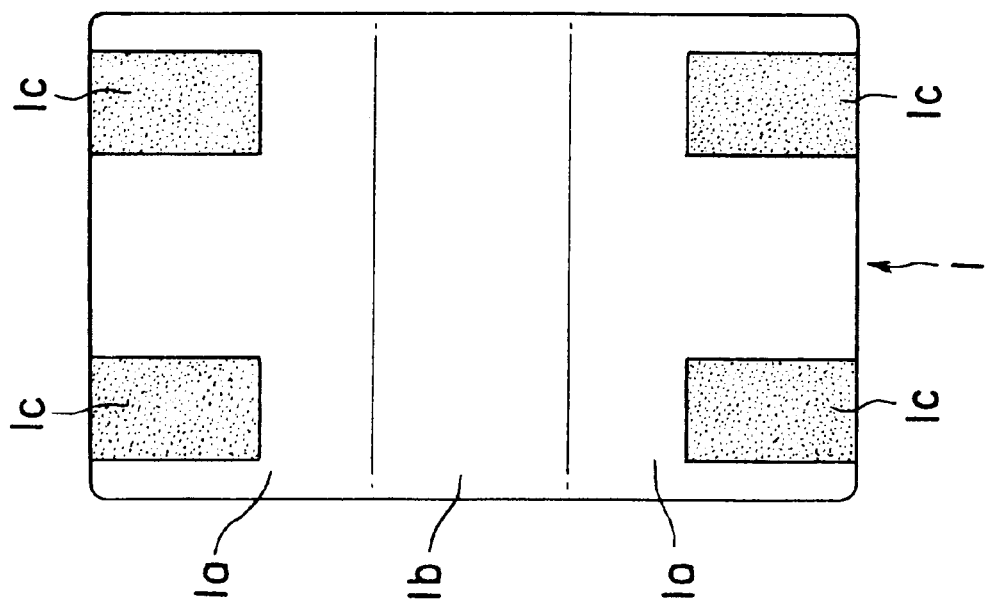

FIG. 3A, FIG. 3B and FIG. 3C are a front view, a right side view and a rear view of the third embodiment of the present invention. The third embodiment combines and develops the first embodiment shown in FIG. 1 and the second embodiment shown in FIG. 2, by providing four magnetic strips (1c) on the front and rear of the card (1).

Thus, the card of this embodiment will be accepted by the card processor even when the card processor has sensors for detecting magnetic strips on the left and right sides of the card insertion opening.

Figure 4C:
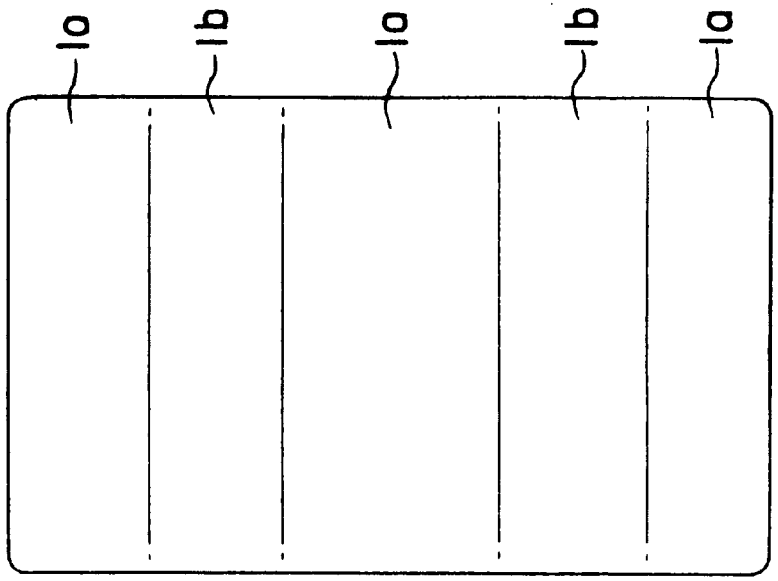
FIG. 4A, FIG. 4B and FIG. 4C are front view, a right side view and a rear of the fourth embodiment of the present invention.
Figure 4B:
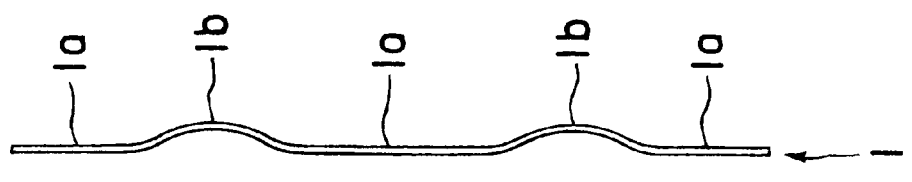
Figure 4A:
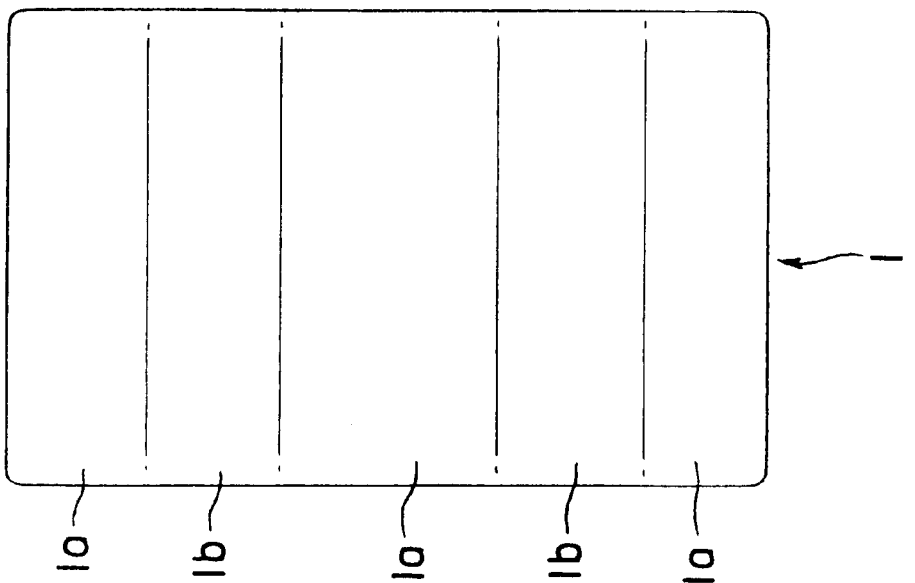
Figure 6:
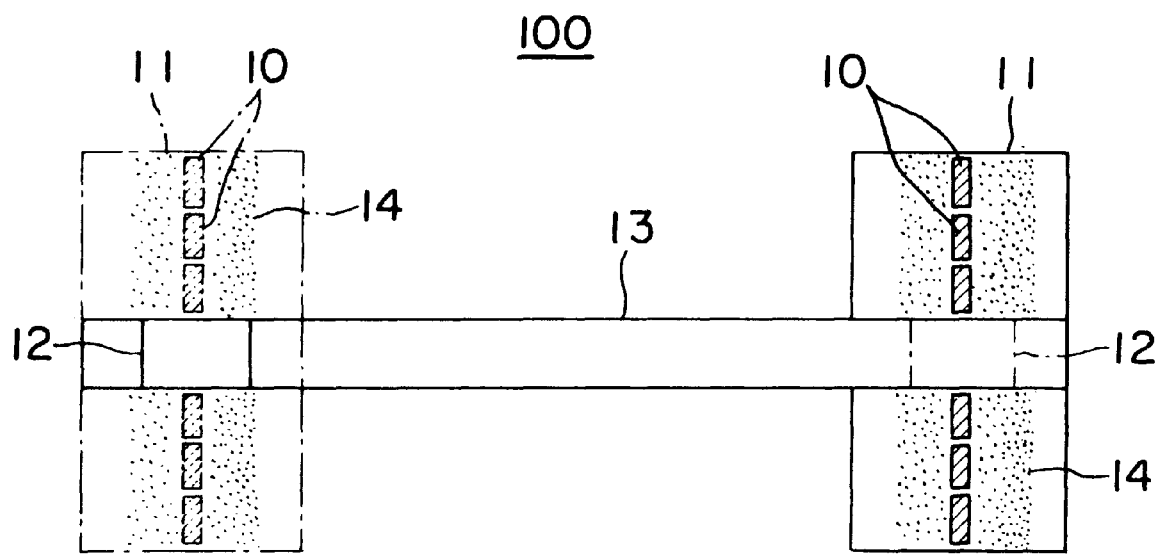
FIG. 6 illustrates the plane shape of a card processor using the cleaning card of the present invention.
Figure 7:
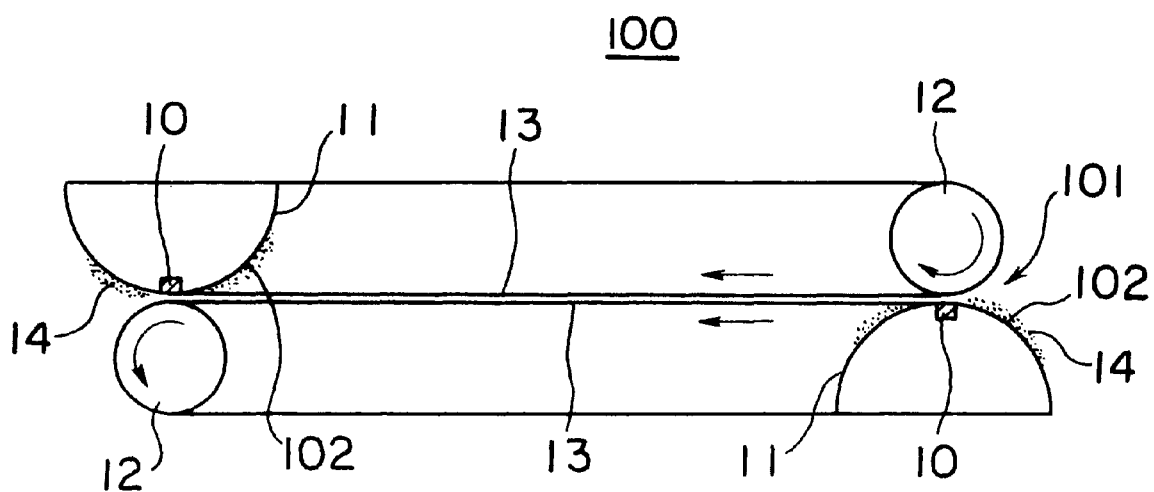
FIG 7 illustrates a side shape of the card processor of FIG. 6.

FIG. 4A, FIG. 4B and FIG. 4C are a front view, a right side view and a rear view of the fourth embodiment of the present invention. In the fourth embodiment, curved portions 1b are provided at two places, increasing the cleaning effectiveness. In this embodiment, no magnetic strips (1c) are provided, and other means must be employed for opening the card passageway.

In addition to the two flat portions (1a), which were provided at the ends of the card (1) in the first to third embodiments shown in FIG. 1~FIG. 3, an additional flat portion (1a) is provided in the center, and two curved portions (1b) are provided between the flat portions (1a). In this embodiment, both curved portions 1b protrude in the same direction, that is, toward the rear face.

This offers one extra convexity and concavity than in the first to third embodiments. Consequently, the number of times the card contacts with and separates from the card passageway increases, thereby improving the cleaning effectiveness.

FIG. 5A, FIG. 5B and FIG. 5C are a front view, a right side view and a rear view of the fifth embodiment of the present invention. The fifth embodiment differs from the fourth embodiment shown in FIG. 4 in that the curved portions of the card (1b) protrude in opposite directions. The curved portion (1b) shown at the top of FIG. 5 protrudes inwards, while the curved portion 1b shown in the bottom of FIG. 5 protrudes outwards. This provides even greater cleaning effectiveness than the construction described in the fourth embodiment.

The present invention described above thus removes fine dust particles and dirt along the card passageway extending from the card insertion opening to the exit of the card processor, and especially around the reading heads, thereby maintaining correct performance and smooth operation of the card processor.

What is claimed is:

1. A cleaning card, comprising:

a substrate, which comprises resilient paper, compound resin, or a thin metallic sheet, forming a rectangle, said substrate having flat portions at both ends of said rectangle, and a convex curved portion, a concave portion, provided in a roughly central portion;

a cleaning face member, comprising unwoven cloth of extremely fine texture, pasted to said front face of said substrate; and magnetic strips, provided on said cleaning face member and near ends of short sides of said rectangle.

2. A cleaning card according to claim 1, wherein said magnetic strips are provided in at least two places near same long sides of said rectangle on at least one of said front or rear faces.

3. A cleaning card according to claim 1, wherein said magnetic strips are provided in at least two places in a diagonal direction on either of said front and rear faces of said rectangle.

4. A cleaning card, comprising:

a substrate, which comprises resilient paper, compound resin, or a thin metallic sheet, and is a rectangle with front and rear faces, said substrate having at least two curved portions, convex on one of said front and rear faces and concave on another; and a cleaning face member, comprising unwoven cloth of extremely fine texture, pasted to said front face of said substrate.

5. A cleaning card according to claim 4, wherein at least two of said curved portions are formed on the said card curves, convex one and one concave.

6. A cleaning card according to claim 4, wherein said curved portions comprise a first curve, convex on one side and concave on the other, and a second curve, concave on one side and convex on the other.

* * * * *

(12) EX PARTE REEXAMINATION CERTIFICATE (5619th)
United States Patent
Nakajima et al.

(10) Number: US 6,107,221 C1
(45) Certificate Issued: Nov. 28, 2006

(54) CARD FOR CLEANING A CARD PROCESSOR

(76) Inventors: Norio Nakajima, 1-2-3 Yawata, Ichikawa-shi, Chiba-ken (JP); Isao Moriki, 9-18-5-201, Kitami, Setagaya-ku, Tokyo-to (JP)

Reexamination Request:
No. 90/007,156, Aug. 6, 2004

Reexamination Certificate for:
Patent No.: 6,107,221
Issued: Aug. 22, 2000
Appl. No.: 09/222,691
Filed: Dec. 29, 1998

(30) Foreign Application Priority Data

Mar. 18, 1998 (JP) .......................................... 10-068934

(51) Int. Cl.
*D04H 3/16* (2006.01)
*G06K 19/00* (2006.01)
*G06K 19/06* (2006.01)

(52) U.S. Cl. ...................... 442/401; 235/488; 235/487; 235/493; 428/327; 15/210.1

(58) Field of Classification Search ................. 235/488, 235/487, 493, 449; 442/401; 428/90, 327; 15/210.1, 104.93, 104.94, 118
See application file for complete search history.

(56) References Cited

U.S. PATENT DOCUMENTS 3,922,438 A 11/1975 Brown et al.
5,153,964 A 10/1992 Gelardi et al.
5,824,611 A 10/1998 Eyler
5,932,868 A * 8/1999 McCall et al. ............... 235/493
6,156,407 A * 12/2000 Neubauer et al. ............. 428/90

FOREIGN PATENT DOCUMENTS

DE 35 38 223 A1 * 4/1987

* cited by examiner

*Primary Examiner*—Jared J. Fureman

(57) ABSTRACT

Blockage of reading head sensors in a card processor is prevented by removing fine dust particles and dirt. This can be prevented with a rectangular cleaning card comprising a substrate, which comprises resilient paper, compound resin, or a thin metallic sheet, the substrate having flat portions at both ends of the rectangle, and a curved portion, convex on one side of the card and concave on the other, provided roughly in the center of the card; a cleaning face member, comprising unwoven cloth of extremely fine texture, pasted to the front face of the substrate, and magnetic strips, provided on the cleaning face and near the ends of the rectangle; and a rectangular cleaning card, comprising a substrate, which comprises resilient paper, compound resin, or a thin metallic sheet, the substrate having at least two curved portions, convex on one side of the card and concave on the other, and a cleaning face member, comprising unwoven cloth of extremely fine texture, pasted to the front face of the substrate.

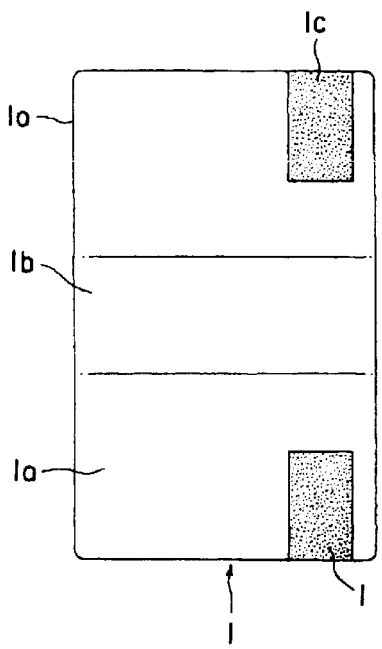

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–6 are cancelled.

* * * * *